May 25, 1926. 1,585,763
A. J. CHAPIN
AUTOMOTIVE BRAKE MECHANISM
Filed Oct. 19, 1923.
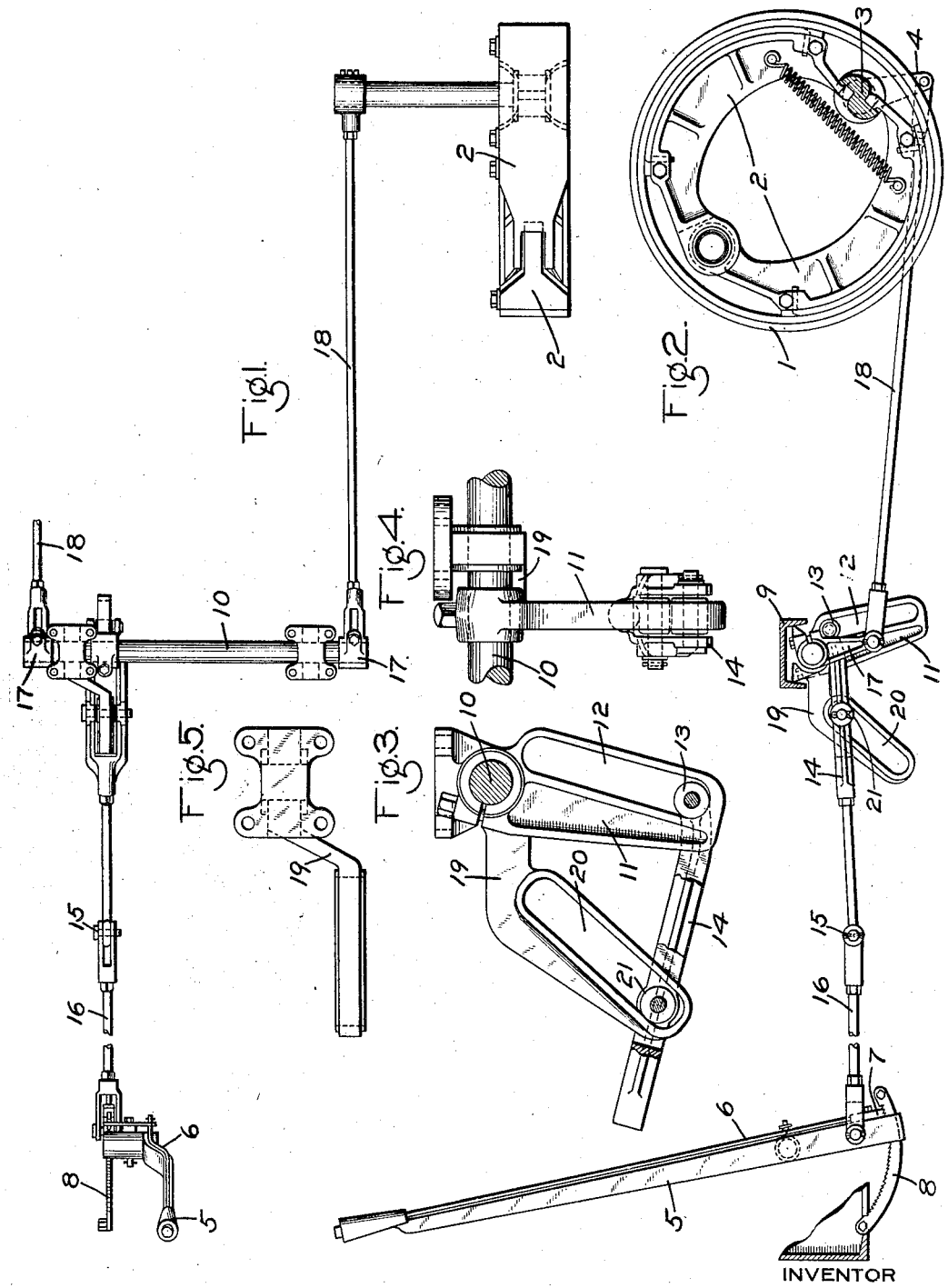
INVENTOR
ALBERT J. CHAPIN
BY *Wm. M. Cady*
ATTORNEY Patented May 25, 1926.

1,585,763

UNITED STATES PATENT OFFICE.

ALBERT J. CHAPIN, OF OAKLAND, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE MECHANISM.

Application filed October 19, 1923. Serial No. 669,530.

This invention relates to brakes, and more particularly to a manually controlled brake for a motor vehicle.

The principal object of my invention is to provide a hand operated brake of the above character having means for varying the braking leverage ratio as the hand lever is moved in applying the brakes.

In the accompanying drawing; Fig. 1 is a plan view of a motor vehicle brake equipment embodying my invention; Fig. 2 a side elevation thereof; Fig. 3 an enlarged side elevation of the differential lever, showing the same in brake applied position; Fig. 4 an end elevation of said lever; and Fig. 5 an enlarged plan view of the guide member and bearing.

As shown in the drawing, the vehicle brake equipment may comprise a brake drum 1 associated with each of the rear wheels of the vehicle and containing a pair of internal brake shoes 2 having one pair of ends pivotally connected together and the other pair of ends separated by a cam 3, the cam being operatively connected to an operating lever 4.

In the usual position on the vehicle is pivotally mounted a hand brake lever 5 having the usual latch rod for operating locking pawl 7 which is adapted to engage the teeth of ratchet segment 8.

Mounted in suitable bearings secured to vehicle cross member 9 intermediate the hand lever 5 and the brake drum 1 is a cross shaft 10 and secured to said shaft is a differential lever 11.

The lever 11 is provided with a slot 12, within which a roller 13 is mounted to slide, and said roller is carried in the forked end of a pull rod 14. The other end of said rod is pivotally connected at 15 to the rod 16, which in turn is pivotally connected to the hand lever 5.

Secured to the shaft 10 at each of its opposite ends is a lever 17 and pivotally connected to each lever is a pull rod 18 which is operatively connected to the lever 4 associated with each brake drum.

Preferably secured to one of the bearings of the cross shaft 10 is a guide member 19 having an inclined slot 20 adapted to receive a roller 21 carried between the forked ends of the rod 14, the guide member 19 being offset, as shown in Fig. 5, so as to cause the slot 20 to aline with the forked end of rod 14. The inclination of the slot 20 is such that upon movement of the hand lever 5 to release the brakes, the roller 21 engages the right hand face of the slot 20, which then acts as a cam to effect the upward movement of the rod 14 to release position.

With the parts in release position, as shown in Fig. 2, the angular position of the slot 12 of the differential lever 11 is such that roller 13 tends to remain in its extreme upper position when power is applied through the operation of hand lever 5 tending to pull the rod 14 toward the left.

In operation, if it is desired to apply the brakes, the hand lever 5 is moved toward the right, thus causing a movement of the rod 14 toward the left. This movement rotates the differential lever 11 and thereby the shaft 10 is rotated, causing the lever 17 to exert a pulling force on the rod 18.

The lever 4 is then operated to effect rotation of the cam 3, so that the brake shoes 2 are subjected to a spreading force, causing same to engage the brake drum 1.

As the brake lever 5 is moved to the right, the differential lever 11 is rotated until the slot 12 therein assumes a vertical position and then further movement causes the slot to assume positions in which the angularity of the slot is such that the roller 13 will shift to the extreme lower end of the slot, as shown in Fig. 3. While the roller is in its extreme upper position, the lever ratio is such that a given movement of rod 14 will cause a greater movement of the rod 18, but when the roller 13 is shifted to the lower extreme position in slot 12, the lever ratio is changed, so that a given movement of rod 14 produces a less movement of the rod 18.

By means of the above construction, during the initial movement of the hand brake lever 5, when the brake shoes are being brought into engagement with the brake drum and little power is required, a slight movement of the hand lever effects a considerable movement of the brake shoes but after the initial movement, the lever ratio being changed by the shifting of the roller 13 to its extreme lower position, the brakes can be applied with considerable force through the continued movement of the hand lever 5.

To release the brakes, the hand lever 5 is moved toward the left and the guide member 19 now acts to force the rod 14 upwardly, through engagement of the roller 21 with the right hand inclined face of the slot 20, so that finally the roller 13 is returned to release position, as shown in Fig. 2, upon a sufficient movement of the hand lever 5 toward the left.

Having now described my invention, what I claim as new and desire to secure by Letters Patent, is:—

1. In a vehicle brake, the combination with braking members, a hand lever, and operating connections between said hand lever and said braking members including a pull rod connected to said hand lever, and a brake rod connected to said braking members, of a lever operatively connected to said brake rod and having a slot operatively connected to the end of said pull rod and a guide member having a guide face operatively engaging said rod to direct the movement of said rod in releasing the brakes.

2. In a vehicle brake, the combination with braking members, a hand lever, and operating connections between said hand lever and said braking members including a pull rod connected to said hand lever, and a brake rod connected to said braking members, of a lever operatively connected to said brake rod and having a slot operatively connected to the end of said pull rod, a guide member having an inclined face, and a roller carried by said pull rod and adapted to engage said inclined face.

In testimony whereof I have hereunto set my hand.

ALBERT J. CHAPIN.